(12) United States Patent
Nuernberg

(10) Patent No.: US 11,747,439 B2
(45) Date of Patent: Sep. 5, 2023

(54) METHOD AND DEVICE FOR CALIBRATING A SENSOR SYSTEM OF A MOVING OBJECT

(71) Applicant: Robert Bosch GmbH, Stuttgart (DE)

(72) Inventor: Thomas Nuernberg, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 298 days.

(21) Appl. No.: 17/184,046

(22) Filed: Feb. 24, 2021

(65) Prior Publication Data

US 2021/0278500 A1  Sep. 9, 2021

(30) Foreign Application Priority Data

Mar. 3, 2020 (DE) .......................... 102020202679.3

(51) Int. Cl.
*G01S 7/40* (2006.01)
*B60R 11/02* (2006.01)
*G01S 13/931* (2020.01)

(52) U.S. Cl.
CPC ........ *G01S 7/4021* (2013.01); *B60R 11/0264* (2013.01); *G01S 13/931* (2013.01)

(58) Field of Classification Search
CPC ........ G01S 7/40; G01S 7/4021; G01S 7/4091; G01S 7/497; G01S 13/931; B60R 11/0264
See application file for complete search history.

(56) References Cited

U.S. PATENT DOCUMENTS

| | | | | |
|---|---|---|---|---|
| 8,730,457 | B2* | 5/2014 | Rothenberger | G01S 17/87 356/3.01 |
| 10,782,402 | B2* | 9/2020 | Zoeke | G01S 7/40 |
| 10,916,035 | B1* | 2/2021 | Kroeger | G06F 18/22 |
| 10,962,630 | B1* | 3/2021 | Walls | G01S 7/4972 |
| 11,555,903 | B1* | 1/2023 | Kroeger | G05D 1/0274 |
| 2019/0293756 | A1* | 9/2019 | Blaes | G01S 7/4972 |
| 2020/0300967 | A1* | 9/2020 | Demerly | G01S 17/931 |
| 2021/0089058 | A1* | 3/2021 | Stoschek | G01S 17/931 |

(Continued)

FOREIGN PATENT DOCUMENTS

| | | |
|---|---|---|
| DE | 102007005086 A1 | 8/2008 |
| DE | 102010060942 A1 | 6/2012 |
| DE | 102018008792 A1 | 5/2019 |

OTHER PUBLICATIONS

SAE Standard J3016 "Taxonomy and Definitions for Terms Related to On-Roas Motor Vehicle Automated Driving Systems." Jan. 2014. Retrived from the Internet on Feb. 23, 2021: https://www.sae.org/standards/content/j3016_201401/. 12 Pages.

*Primary Examiner* — Peter M Bythrow
(74) *Attorney, Agent, or Firm* — NORTON ROSE FULBRIGHT US LLP; Gerard Messina

(57) ABSTRACT

A method and device for calibrating a sensor system of a moving object. The sensor system includes a plurality of individual sensors. Each individual sensor has a particular detecting range. Each of these sensors having a detecting range at least partially overlapping with at least one further sensor of the sensor system. The method includes: defining a virtual overall sensor based on a merger of the particular detecting ranges of each individual sensor; determining first coordinates of a plurality of external objects, as well as second coordinates of selected points of the moving object; and orienting the virtual overall sensor relative to the moving object, as a function of the first and second coordinates.

9 Claims, 3 Drawing Sheets

(56) References Cited

U.S. PATENT DOCUMENTS

2021/0190922 A1* 6/2021 Yu .......................... G01S 7/497
2021/0372796 A1* 12/2021 Lin ....................... G01C 21/20
2022/0317288 A1* 10/2022 Goda ................... G01S 13/931

* cited by examiner

METHOD AND DEVICE FOR CALIBRATING A SENSOR SYSTEM OF A MOVING OBJECT

CROSS REFERENCE

The present application claims the benefit under 35 U.S.C. § 119 of German Patent Application No. DE 102020202679.3 filed on Mar. 3, 2020, which is expressly incorporated herein by reference in its entirety.

FIELD

The present invention relates to, inter alia, a method and a device for calibrating a sensor system of a moving object; the sensor system including a plurality of individual sensors; each individual sensor having a particular detecting range; each of these sensors having a detecting range at least partially overlapping with at least one further sensor of the sensor system.

SUMMARY

A method in accordance with an example embodiment of the present invention for calibrating a sensor system of a moving object includes a step of defining a virtual overall sensor on the basis of a merger of the particular detecting ranges of each individual sensor, a step of determining first coordinates of a plurality of external objects and second coordinates of selected points of the moving object, and a step of orienting the virtual overall sensor relative to the moving object, as a function of the first and second coordinates. In this context, the sensor system includes a plurality of individual sensors; each individual sensor having a particular detecting range; each of these sensors having a detecting range at least partially overlapping with at least one further sensor of the sensor system.

A sensor is to be understood as a video sensor or a radar sensor or a lidar sensor or an ultrasonic sensor or a further sensor, which is designed to monitor a surrounding area of the sensor. A sensor system, which includes a plurality of individual sensors, is to be understood, for example, as a particular number and/or a particular configuration and/or a particular distribution of sensors, which are contained by the moving object. In this context, these sensors are basically configured to monitor a surrounding area of the moving objects, for example, in the form of data values. In this instance, a detecting range of a sensor is to be understood as the portion of the surrounding area, which may be monitored by this sensor. In one specific embodiment, the sensor system includes only sensors of the same sensor type (lidar, radar, video, etc.). In a further specific embodiment, the sensor system includes sensors of different sensor types (lidar and radar, lidar and video, video and radar, video and lidar and radar, etc.).

A surround sensor system is to be understood as at least one video sensor and/or at least one radar sensor and/or at least one lidar sensor and/or at least one ultrasonic sensor and/or at least one further sensor, which is configured to monitor a surrounding area of the automated vehicles in the form of surrounding-area data values. The surround sensor system is configured, in particular, to detect surrounding-area features in the surrounding area (course of the road, traffic signs, road marking, buildings, roadway boundaries, etc.) and/or traffic objects (vehicles, cyclists, pedestrians, etc.). In one specific embodiment, the surround sensor system includes, for example, a processing unit (processor, working memory, hard disk) having suitable software, and/or is connected to such a processing unit, through which these surrounding-area features may be recorded and/or classified, that is, assigned.

The method in accordance with an example embodiment of the present invention advantageously achieves the object of determining extensive knowledge of the current surrounding area of a moving object. This knowledge, in the form of data values, may be acquired by different sensors. In particular, so-called exteroceptive sensors, such as video, lidar and radar sensors, are used for monitoring the surrounding area. In order to be able to generate a comprehensive surrounding-area model, not only sensors of different sensor types, but also a plurality of sensors of the same sensor type having overlapping (redundant) detecting ranges, are used.

Initially, the data acquired by the sensors are always present in a sensor-specific coordinate system. In order to be able to merge the acquired information suitably in a surrounding-area model, the data must be transformed to a common coordinate system. Normally, a fixed coordinate system of the moving object according to DIN ISO 8855 is used for this, since a motion of the moving object may consequently be described in a user-friendly manner. In this context, the transformation relationships are a function of the installation position and installation orientation of the sensors of the moving object. Therefore, the object of the (extrinsic) calibration is, specifically, to determine the parameters, that is, the transformations between the different coordinate systems, in a precise manner.

This object may advantageously be achieved with the aid of the method in accordance with an example embodiment of the present invention, by performing both sensor-to-sensor calibration and sensor-to-object calibration (in this case: the moving object).

Using the result of a sensor-to-sensor calibration, the measurement data of all of the individual sensors are merged and, thus, combined to form the measurement data of a "virtual overall sensor." Using this merged data, a sensor-to-object calibration is subsequently carried out one time, and thus, the sensor system is calibrated holistically with respect to the object. The sensor-to-sensor calibration and subsequent sensor-to-object calibration allow a benefit to be obtained from the respective advantages of the two methods. These are, in particular:

A robust determination of the installation parameters, in object coordinates, of sensors having, for example, limited detecting ranges in all spatial dimensions.
  Holistic determination of the sensor-to-object transformation for the entire sensor system, while simultaneously retaining a representation of the surrounding area that is consistent in itself.
  Reduction of the calibration errors by combining the two methods.

The moving object is preferably a vehicle. A vehicle may be understood as any driving, floating or flying vehicle, which is designed to contain a sensor system and to monitor the surrounding area of this sensor system. In a further specific embodiment, a moving object is to be understood as, for example, a robot or a robotic vehicle. In one further specific embodiment, a moving object is to be understood, for example, as a loading bridge, as is used, inter alia, for loading and unloading containers in ships, etc. In this connection, the sensor system is used, for example, to dock with a static object (container, etc.) in spite of wave action and accompanying movement of the ship. A vehicle is also to be understood, in particular, as an automated vehicle, which is designed in accordance with one of SAE levels 1 through 5 (see SAE standard J3016).

The plurality of external objects are preferably arranged in a geometric shape; the moving object being located inside of this geometric shape (during the execution of the calibration method). External objects are to be understood, for example, as so-called calibration targets. In one specific embodiment, the calibration targets include, for example, calibration patterns, in order to enable calibration of a sensor.

The defining of the virtual sensor preferably includes the following steps (S1 through S5):

S1: determining a selected, first sensor from the sensors of the sensor system in accordance with specified criteria;

S2: determining a second sensor of the sensor system, which includes a detecting range at least partially overlapping with the first sensor:

S3: determining a first spatial relationship between the first sensor and the second sensor:

S4: defining a first virtual sensor, which represents the first and the second sensors, by merging the detecting range of the first sensor and the detecting range of the second sensor as a function of the first spatial relationship; and S5: repeating steps S1 through S4 for all of the sensors of the sensor system; according to step S1, in each instance, the virtual sensor defined to start with, corresponding to the selected sensor; according to step S2, in each instance, a sensor of the sensor system that is not yet used being newly selected; this newly selected sensor having a detecting range at least partially overlapping with the virtual sensor defined to start with; according to step S3, in each instance, a spatial relationship between the newly selected sensor and the virtual sensor defined to start with, being determined; according to step S4, a further virtual sensor being defined, which represents the sensors of the virtual sensor defined to start with, and the newly selected sensor, until a virtual overall sensor is defined as a function of all of the sensors.

In one specific embodiment of the present invention, the specified criteria include, for example, performance characteristics of the individual sensors; the sensor, which has the greatest resolution and/or the greatest detecting range, etc., being selected as the first sensor.

The spatial relationship between a virtual sensor and an individual sensor and/or between, in each instance, individual sensors, preferably including three translation coordinates and/or three rotation coordinates, in particular, relative to a specified coordinate system. A specified coordinate system is to be understood as, for example, a sensor coordinate system of the virtual sensor or a sensor coordinate system of an individual sensor or a coordinate system of the moving object.

A device of an example embodiment of the present invention, in particular, a control unit, is configured to execute all steps of the method according to one of the corresponding method embodiments.

In one possible specific embodiment of the present invention, the device includes a processing unit (processor, working memory, hard disk), as well as suitable software, in order to execute the method according to one of the method claims. In addition, the device includes, for example, a transmitting and/or receiving unit, which is configured to exchange data values by wire or wirelessly with the sensor system and/or with each individual sensor. In one alternative specific embodiment, the device is connected to a transmitting and/or receiving device with the aid of a suitable interface.

A computer program in accordance with an example embodiment of the present invention includes commands, which, upon execution of the computer program by a computer, cause it to carry out a method for calibrating a sensor system of a moving object according to one of the method embodiments. In one specific embodiment, the computer program corresponds to the software contained by the device.

Moreover, a machine-readable storage medium, in which the computer program is stored, is provided in accordance with an example embodiment of the present invention.

Advantageous further refinements of the present invention are disclosed herein.

BRIEF DESCRIPTION OF THE DRAWINGS

Exemplary embodiments of the present invention are represented in the figures and are explained in more detail in the descriptions below.

DETAILED DESCRIPTION OF EXAMPLE EMBODIMENTS

Figure 1:
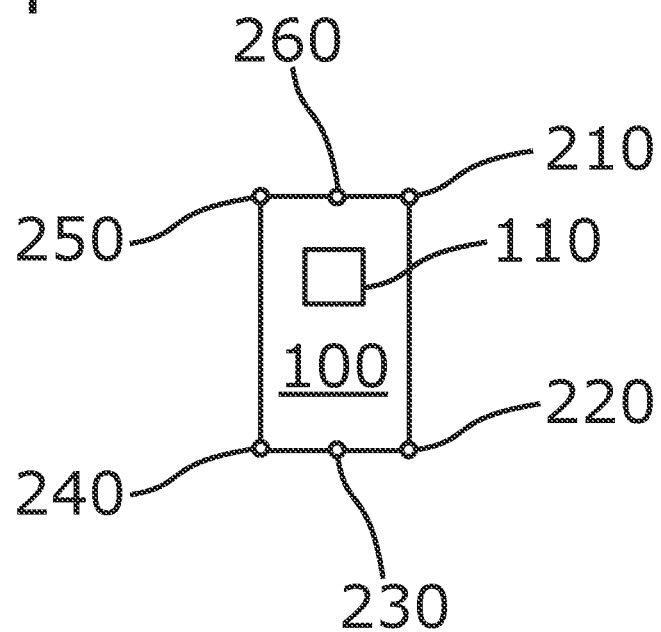
FIG. 1 shows a first exemplary embodiment of the method according to an example embodiment of the present invention.

FIG. 1 shows a first exemplary embodiment of a method 300 for calibrating a sensor system of a moving object 100; here, the moving object 100 being represented purely schematically as a rectangle. In this case, it could be, for example, a vehicle (viewed from above). The moving object includes a device 110, which is configured to execute all steps of method 300.

In addition, moving object 100 includes, in this case, six sensors 210-260 by way of example, which, in the representation used here schematically, are attached to moving object 100 on the outside. In one possible specific embodiment, for example, at least one sensor may be situated on and/or under moving object 100 and/or at any other desired position on moving object 100. In this context, the exact positions of sensors 210-260 are a function of, in particular, the type of moving object 100 (vehicle, robot, loading device, etc.) and/or the form of moving object 100 (size, velocity profile, degree of automation (e.g., SAE level), etc.).

Figure 2:
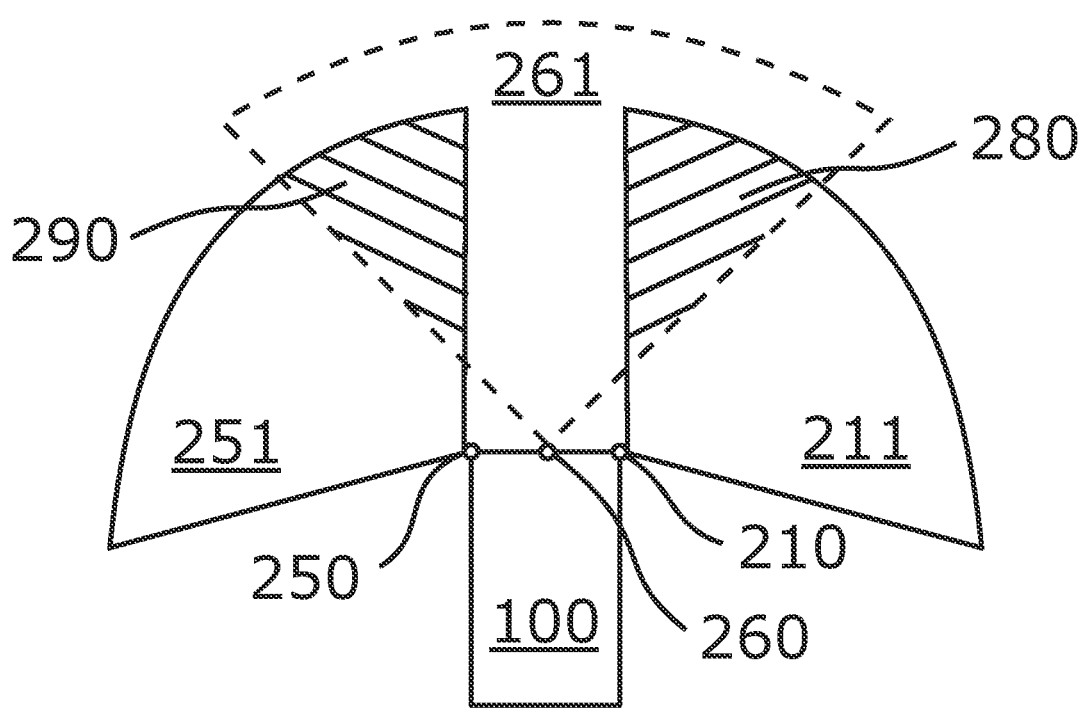
FIG. 2 shows a second exemplary embodiment of the method of the present invention.

FIG. 2 shows a second exemplary embodiment of a method 300 for calibrating a sensor system of a moving object 100; here, examples of several detecting ranges 211, 251, 261 of individual sensors 210, 250, 260 being shown. In this connection, for example, two detecting ranges (211 and 261; 251 and 261) of two sensors (210 and 260; 250 and 260), respectively, overlap to form at least partially overlapping detecting ranges 280, 290, respectively.

Figure 3A:
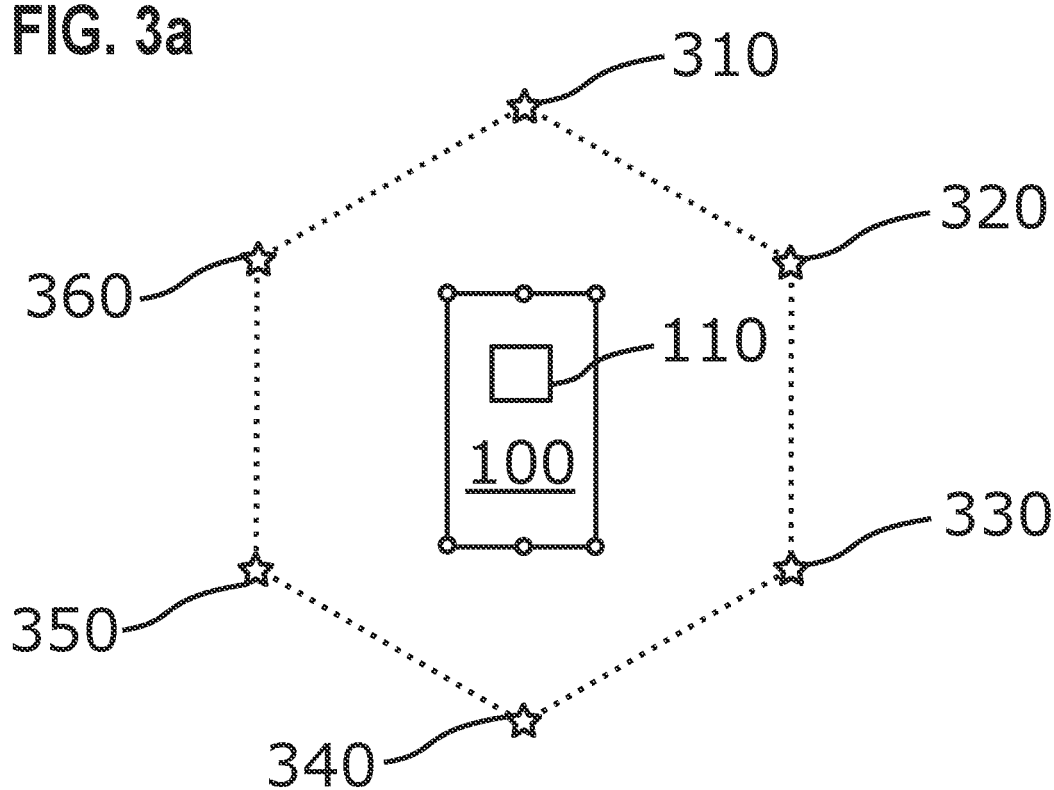
FIGS. 3a and 3b show a third exemplary embodiment of the method of the present invention.
Figure 3B:
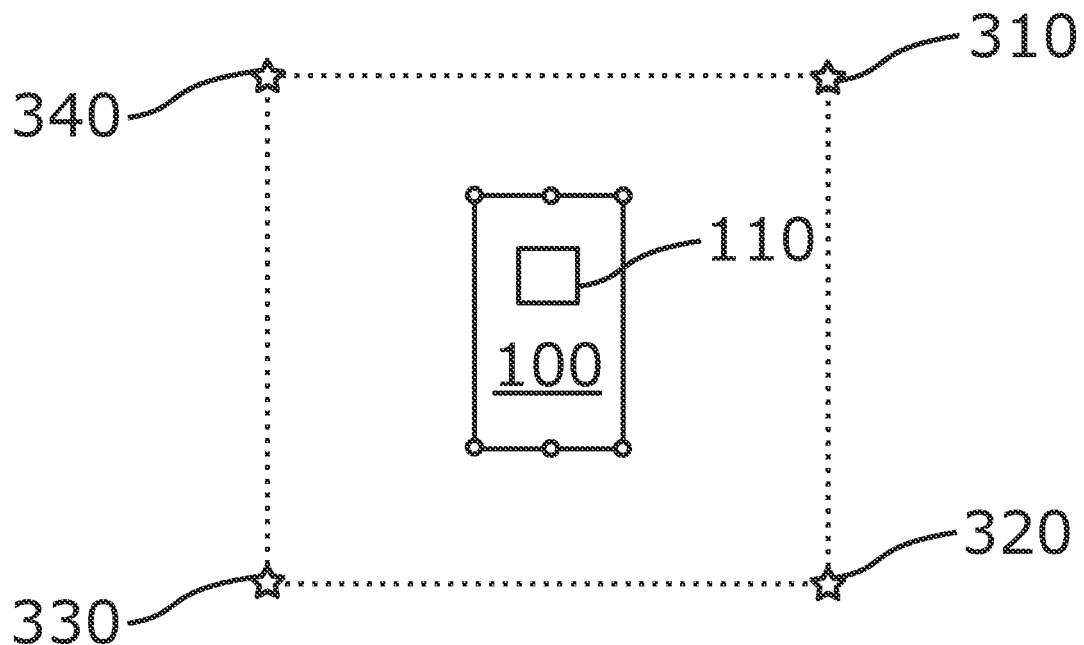

FIGS. 3a and 3b show a third exemplary embodiment of a method 300 for calibrating a sensor system of a moving object 100, which includes device 110 for executing method 300.

In this context, FIGS. 3a and 3b show, in examples of possible specific embodiments (hexagon and rectangle, respectively), how a plurality of external objects 310-360 are arranged in a geometric shape; in each instance, moving object 100 being situated inside of the geometric shape.

In further specific embodiments of the present invention, any desired number of external objects having several different configurations, even irregular ones, are possible.

Figure 4A:
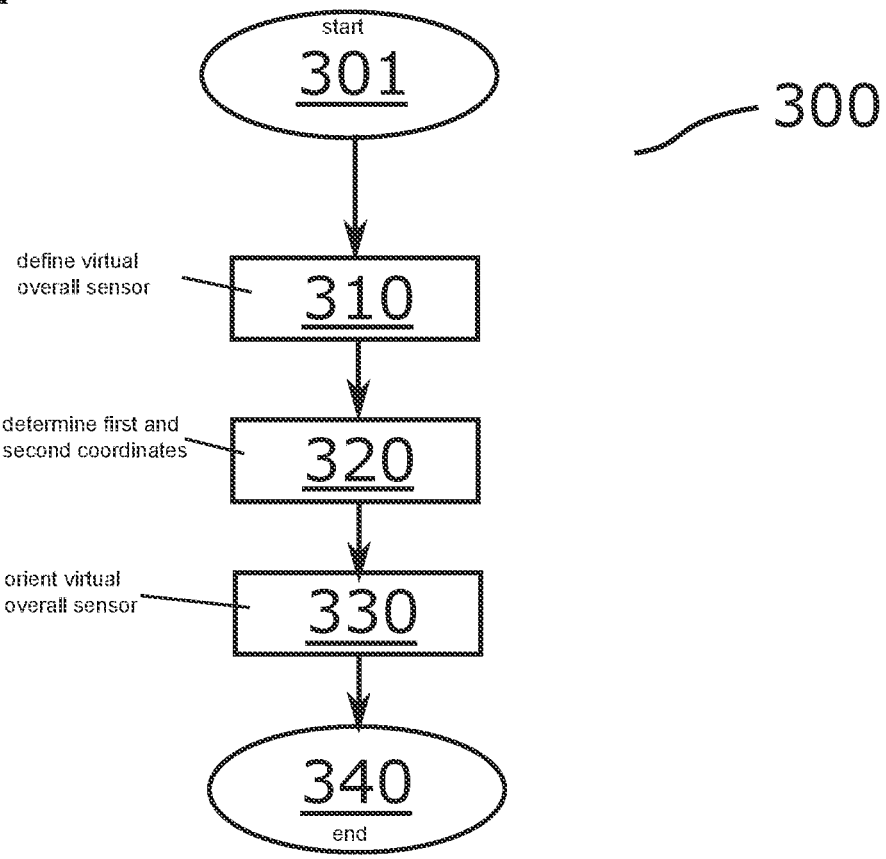
FIGS. 4a and 4b show a fourth exemplary embodiment of the method according to the present invention, in the form of a flow chart.

FIG. 4a shows, in the form of a flow chart, a fourth exemplary embodiment of method 300 of the present invention for calibrating a sensor system of a moving object 100. In this instance, the sensor system includes a plurality of individual sensors 210, 220, 230, 240, 250, 260; each individual sensor 210, 220, 230, 240, 250, 260 having a particular detecting range 211, 221, 231, 241, 251, 261; each of these sensors 210, 220, 230, 240, 250, 260 having a detecting range at least partially overlapping with at least one further sensor of the sensor system.

Method 300 starts at step 301.

In step 310, a virtual overall sensor is defined, based on a merger of the particular detecting ranges of each individual sensor 210, 220, 230, 240, 250, 260.

In step 320, first coordinates of a plurality of external objects 310, 320, 330, 340, 350, 360, as well as second coordinates of selected points of moving object 100, are determined.

In step 330, the virtual overall sensor is oriented relative to moving object 100, as a function of the first and second coordinates.

Method 300 ends at step 340.

Figure 4B:
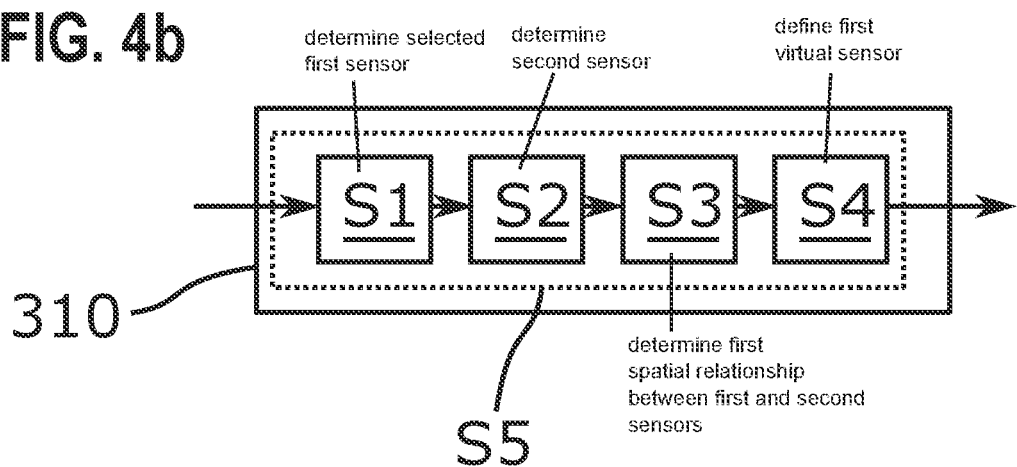

FIG. 4b shows an example of a possible, detailed specific embodiment of the defining 310 of the virtual sensor, including the following (partial) steps (S1 through S5):

In step S1, a selected, first sensor 210 from sensors 210, 220, 230, 240, 250, 260 is determined according to specified criteria.

In step S2, a second sensor 220 of the sensor system, which includes a detecting range at least partially overlapping with first sensor 210, is determined.

In step S3, a first spatial relationship between first sensor 210 and second sensor 220 is determined.

In step S4, a first virtual sensor is defined, which represents first and second sensors 210, 220. This is accomplished by merging detecting range 211 of the first sensor 210 and detecting range 221 of second sensor 220 as a function of the first spatial relationship.

In step S5, steps S1 through S4 are repeated for all sensors 210, 220, 230, 240, 250, 260 of the sensor system; according to step S1, in each instance, the virtual sensor defined to start with, corresponding to the selected sensor; according to step S2, in each instance, a sensor of the sensor system that is not yet used being newly selected; this newly selected sensor having a detecting range at least partially overlapping with the virtual sensor defined to start with; according to step S3, in each instance, a spatial relationship between the newly selected sensor and the virtual sensor defined to start with, being determined; according to step S4, a further virtual sensor being defined, which represents the sensors of the virtual sensor defined to start with, as well as the newly selected sensor, until a virtual overall sensor is defined as a function of all of the sensors 210, 220, 230, 240, 250, 260.

By way of example, method 300 for calibrating a sensor system of a moving object 100 is introduced once more in light of static calibration of six lidar sensors; in this case, a vehicle being assumed to be the moving object for the purpose of clarifying the individual steps. Four of the sensors are attached to the corners of the vehicle to have a resulting visual range of approximately 270°, and two are attached to the roof of the vehicle to have a visual range of 360°. In order not to influence the calibration result through synchronization errors of the sensors, the vehicle is placed in a static environment with all of the sensors. In a first step, the transformation relationships between the lidar sensors having an overlapping detecting range are determined, using sensor-to-sensor calibration. To that end, two sensors having an overlapping detecting range are initially selected, e.g., the left front and right front sensors, of which one, e.g., the left front, is defined as a pivot sensor. The transformation between these two sensors is determined by a standard method for point cloud registration, e.g., the Normal Distribution Transform. The data of the second sensor are then transformed into the coordinate system of the pivot sensor and combined to form a new point cloud. This new point cloud is interpreted as a measurement of a "virtual" front sensor. Subsequently, the transformation relationship of a further sensor, e.g., the right rear one, with respect to this "virtual" front sensor, is determined in accordance with the same method, and the data are combined again to form a further "virtual" sensor. This is repeated until the data of all of the sensors are combined to form a "virtual overall sensor." Consequently, the transformations of all of the sensors with respect to the pivot sensor are determined.

In the next step, the method of sensor-to-vehicle calibration may be used once for this "virtual overall sensor." To that end, for example, six planar, rectangular calibration targets are additionally established in the surrounding area, as shown in FIG. 3a. In this surrounding area, the data of all of the sensors are recorded for further processing. Using an external reference measuring system, e.g., a tachymeter, the first coordinates of the six external calibration targets and the second coordinates of the reference points of the vehicle are determined. The virtual overall sensor is oriented with respect to the vehicle as a function of these first and second coordinates and as a function of the recorded data, and thus, the transformation between the coordinate system of the sensor-to-sensor calibration and the vehicle coordinate system is determined. All further sensor-to-vehicle transformations are then calculated as a function of that.

What is claimed is:

1. A method for calibrating a sensor system of a moving object, the method comprising:
   defining a virtual overall sensor, based on a merger of particular detecting ranges of each of a plurality of individual sensors, wherein the sensor system including the plurality of individual sensors, each of the individual sensors having a particular detecting range, and each of the individual sensors having a detecting range at least partially overlapping with at least one further sensor of the sensor system;
   determining first coordinates of a plurality of external objects, and second coordinates of selected points of the moving object; and
   orienting the virtual overall sensor relative to the moving object, as a function of the first and second coordinates;
   wherein the defining of the virtual sensor includes:
   S1) determining a selected first sensor from the individual sensors of the sensor system according to specified criteria;
   S2) defining a second sensor of the sensor system, which includes a detecting range at least partially overlapping with the first sensor;
   S3) determining a first spatial relationship between the first sensor and the second sensor;
   S4) defining a first virtual sensor, which represents the first and the second sensors, by merging the detecting range of the first sensor and the detecting range of the second sensor, as a function of the first spatial relationship; and S5) repeating steps S1 through S4 for all of the individual sensors of the sensor system.

2. The method as recited in claim 1, wherein the moving object is a vehicle.

3. The method as recited in claim 1, wherein the plurality of external objects are arranged in a geometric shape, and the moving object is situated inside of the geometric shape.

4. The method as recited in claim 1, wherein
according to step S1, in each instance, the virtual sensor defined to start with, corresponds to the selected sensor; according to step S2, in each instance, a sensor of the sensor system that is not yet used is newly selected, the newly selected sensor having a detecting range at least partially overlapping with the virtual sensor defined to start with; according to step S3, in each instance, a spatial relationship between the newly selected sensor and the virtual sensor defined to start with, being determined; according to step S4, a further virtual sensor being defined, which represents the sensors of the virtual sensor defined to start with, as well as the newly selected sensor, until a virtual overall sensor is defined as a function of all of the sensors.

5. The method as recited in claim 4, wherein the spatial relationship between the virtual sensor and an individual sensor of the sensor system and/or between, in each instance, individual sensors of the sensor system, includes three translation coordinates and/or three rotation coordinates.

6. A control apparatus to calibrate a sensor system of a moving object, comprising:
a control unit configured to perform the following:
defining a virtual overall sensor, based on a merger of the particular detecting ranges of a plurality of individual sensors, wherein the sensor system includes a plurality of individual sensors, each of the individual sensors having a particular detecting range, and each of the individual sensors having a detecting range at least partially overlapping with at least one further sensor of the sensor system;
determining first coordinates of a plurality of external objects, and second coordinates of selected points of the moving object; and
orienting the virtual overall sensor relative to the moving object, as a function of the first and second coordinates;
wherein the defining of the virtual sensor includes:
S1) determining a selected first sensor from the individual sensors of the sensor system according to specified criteria;
S2) defining a second sensor of the sensor system, which includes a detecting range at least partially overlapping with the first sensor;
S3) determining a first spatial relationship between the first sensor and the second sensor;
S4) defining a first virtual sensor, which represents the first and the second sensors, by merging the detecting range of the first sensor and the detecting range of the second sensor, as a function of the first spatial relationship; and
S5) repeating steps S1 through S4 for all of the individual sensors of the sensor system.

7. A non-transitory machine-readable storage medium, on which is stored a computer program, which is executable by a processor, comprising:
for calibrating a sensor system of a moving object by performing the following:
defining a virtual overall sensor, based on a merger of the particular detecting ranges of each of a plurality of individual sensors, wherein the sensor system includes a plurality of individual sensors, each of the individual sensors having a particular detecting range, and each of the individual sensors having a detecting range at least partially overlapping with at least one further sensor of the sensor system;
determining first coordinates of a plurality of external objects, and second coordinates of selected points of the moving object; and
orienting the virtual overall sensor relative to the moving object, as a function of the first and second coordinates;
wherein the defining of the virtual sensor includes:
S1) determining a selected first sensor from the individual sensors of the sensor system according to specified criteria;
S2) defining a second sensor of the sensor system, which includes a detecting range at least partially overlapping with the first sensor;
S3) determining a first spatial relationship between the first sensor and the second sensor;
S4) defining a first virtual sensor, which represents the first and the second sensors, by merging the detecting range of the first sensor and the detecting range of the second sensor, as a function of the first spatial relationship; and
S5) repeating steps S1 through S4 for all of the individual sensors of the sensor system.

8. The storage medium as recited in claim 7, wherein according to step S1, in each instance, the virtual sensor defined to start with, corresponds to the selected sensor; according to step S2, in each instance, a sensor of the sensor system that is not yet used is newly selected, the newly selected sensor having a detecting range at least partially overlapping with the virtual sensor defined to start with; according to step S3, in each instance, a spatial relationship between the newly selected sensor and the virtual sensor defined to start with, being determined; according to step S4, a further virtual sensor being defined, which represents the sensors of the virtual sensor defined to start with, as well as the newly selected sensor, until a virtual overall sensor is defined as a function of all of the sensors.

9. The control apparatus as recited in claim 6, wherein according to step S1, in each instance, the virtual sensor defined to start with, corresponds to the selected sensor; according to step S2, in each instance, a sensor of the sensor system that is not yet used is newly selected, the newly selected sensor having a detecting range at least partially overlapping with the virtual sensor defined to start with; according to step S3, in each instance, a spatial relationship between the newly selected sensor and the virtual sensor defined to start with, being determined; according to step S4, a further virtual sensor being defined, which represents the sensors of the virtual sensor defined to start with, as well as the newly selected sensor, until a virtual overall sensor is defined as a function of all of the sensors.

* * * * *